United States Patent [19]
Clément

[11] 3,737,172
[45] June 5, 1973

[54] ARTICULATED AND STEERABLE SNOW SLED

[76] Inventor: Clemént Clement, 1833 rue Guimont, Trois-Riviere, Quebec, Canada

[22] Filed: Oct. 26, 1971

[21] Appl. No.: 192,505

[52] U.S. Cl. ................................................. 280/22
[51] Int. Cl. .......................................... B62b 13/02
[58] Field of Search ..................... 280/22, 21 R, 24, 280/18, 19, 8, 408

[56] References Cited

UNITED STATES PATENTS

| | | | |
|---|---|---|---|
| 3,374,000 | 3/1968 | Wetzel | 280/8 |
| 2,313,235 | 3/1943 | Grove | 280/408 |
| 1,310,252 | 7/1919 | Seifert | 280/22 |
| 2,766,992 | 10/1956 | Rohe | 280/22 |
| 2,601,991 | 7/1952 | Kahle | 280/24 |
| 3,684,306 | 8/1972 | Rathmann | 28/22 |

*Primary Examiner*—Benjamin Hersh
*Assistant Examiner*—Robert R. Song
*Attorney*—Raymond A. Robic

[57] ABSTRACT

A snow sled composed of several flat boards pivotally connected to each other. A manually steering mechanism, associated with a cable system, is provided for steering the sled and giving to it the desired arcuate form when negociating curves. A braking system provides the braking of the sled.

15 Claims, 10 Drawing Figures

PATENTED JUN 5 1973

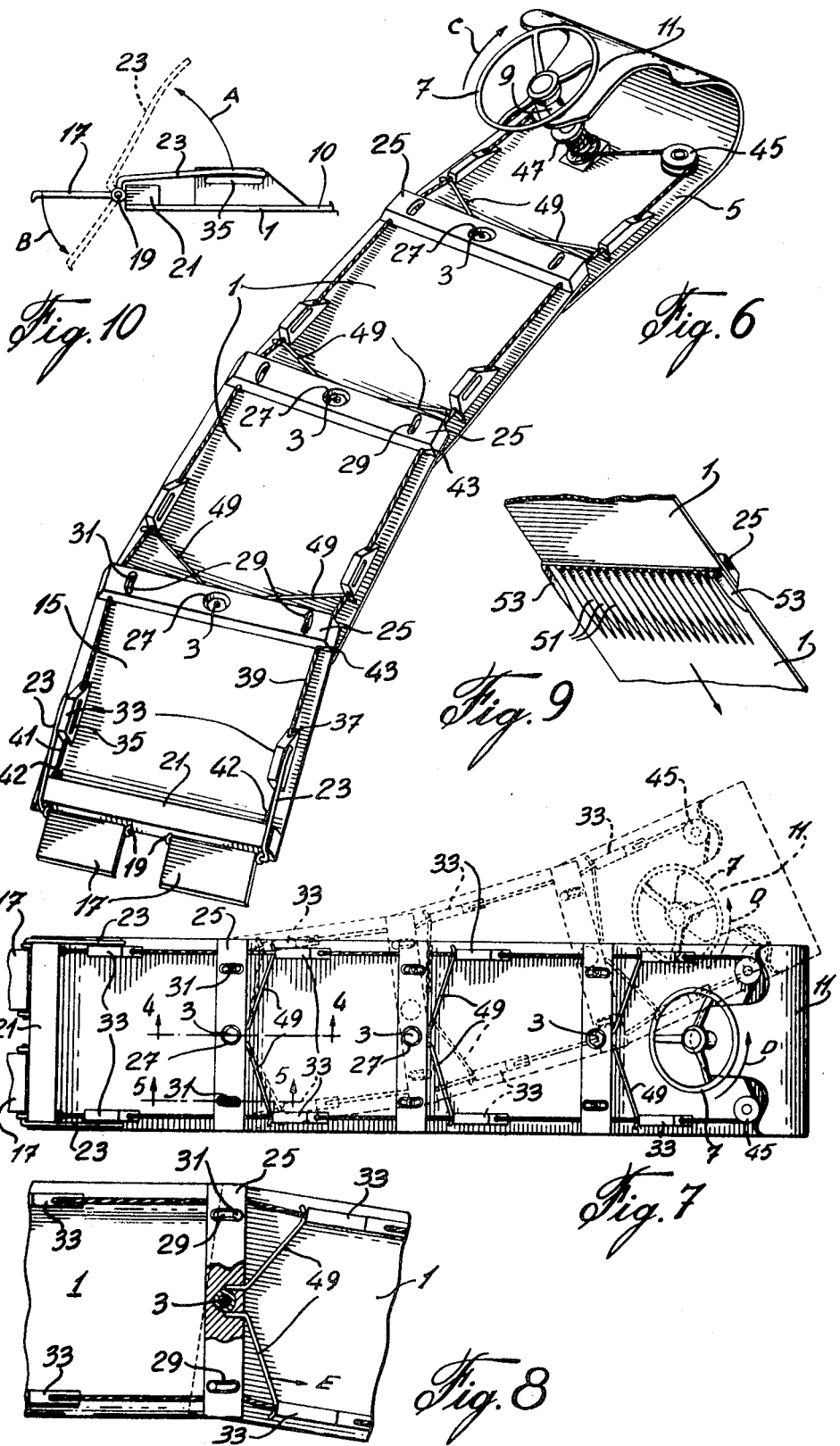

ARTICULATED AND STEERABLE SNOW SLED

The present invention relates to an articulated and steerable snow sled or toboggan.

In the prior art it is already known to construct snow sleds or toboggans which are formed as one rigid structure with no relative movement between their separate parts. These sleds have no flexibility of movement and furthermore are not provided with any manual steering mechanism adapted to steer the sleds when negociating curves.

It is also known in the prior art to construct snow sleds and toboggans which are composed of several sections or units, which sections or units are pivotally connected to each other. Such sleds, which mainly are composed of two sections, do present a flexibility due to the fact that sections are pivotally connected to each other but they are not provided with any manually operated steering mechanism, i.e., there is not the provision of a steering wheel, which permits the proper steering of the sleds. The relative movement of the various sections or units of this type of sleds are made possible through the connecting means of the sections or units due to the weight of the sled occupants or to their feet movement or to other similar means.

I have now devised an articulated sled composed of several units or sections which is provided with an effective flexibility and is associated with a steering mechanism which permits the efficient steering of the sled. In fact, this steering mechanism manually provides the easy relative movement of the different sections or units composing the sled, thus giving to such sled the desired curvature or arcuate form for negociating the curves of different radii. The need to use the weight of the occupants of the sled or the need to use the feet for steering the sled is thus eliminated.

The several sections or units of my sled are made of boards which are pivotally connected to each other.

A manually steering mechanism associated with a cable system running along the lateral sides of said boards is provided for steering the sled and giving to it the desired arcuate form when negociating curves. A braking system provides the braking of the sled and resilient means provides the realignment of the pivoted boards when the steering mechanism is released by the conductor of the sled.

Other features and advantages of the invention will be apparent from the following description of an embodiment of the invention having regard to the attached drawings wherein:

FIG. 6 is a perspective top view of the sled according to the invention;

FIG. 7 is a top view of the sled according to the invention showing the manner in which the sled is steered by means of the steering mechanism;

FIG. 8 is a partial top view showing the manner in which the return springs are connected to the flat boards;

FIG. 9 is a partial bottom view showing runner elements according to the invention;

FIG. 10 is a partial side view of the brake elements connected to the rear edge of the rear board and the handle means for manually operating the brake elements.

Figure 1:
FIG. 1 is a general perspective view of the sled according to the invention.
Figure 2:
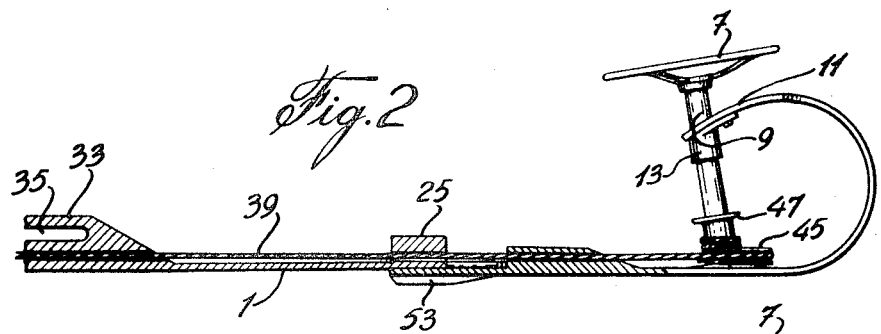
FIG. 2 is a longitudinal cross-section view of the front part of the sled according to the invention, especially showing the steering mechanism of the sled.
Figure 3:
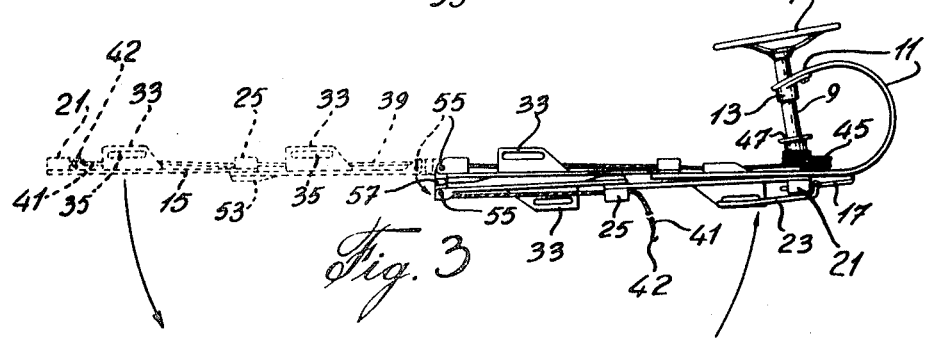
FIG. 3 is a longitudinal side view of the sled according to the invention and showing the sled in a folded position.

Referring now to the Figures, it is shown in FIG. 6 a snow sled or toboggan comprising a plurality of sections or units made of flat boards 1 or the like connected to each other by means of pivots 3. The front board 5 of the sled is provided with a steering mechanism, in this example, which comprises a steering wheel 7 connected to board 5 by means of a steering column 9. The forward edge of said front board 5 is upwardly curved and is provided with a central part 11 which is connected to steering column 9 through a sleeve 13 as best shown in FIGS. 2 and 3. The steering column 9 freely rotates inside sleeve 13 which may act as a support.

The rear board 15 is provided with a braking system which, in this example comprises two blade elements 17 rigidly mounted on pivots 19, which pivots are rotatably connected to a transverse bar 21 fixed at the rear edge of the rear board 15 as best shown in FIG. 10. Pivots 19 are perpendicularly extended with two integral lateral levers 23 located along the lateral sides of rear board 15 for permitting the manual actuation of the blade elements 17 by the occupant of the rear board. When levers 19 are upwardly solicited (arrow A, FIG. 10), blade elements 17 are downwardly urged (arrow B, FIG. 10). The braking system may be located elsewhere on the sled.

Each board 1, except front board 5, is provided with a transverse bar 25 which is connected to the front edge of each of these boards.

Figure 4:
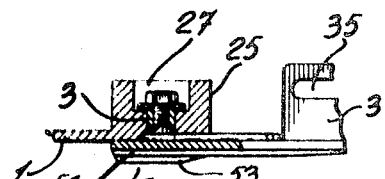
FIG. 4 is a cross-sectional view along line 4—4 of FIG. 7 hereinbelow mentioned.

Pivots 3 connecting two adjacent boards are countersunk inside holes 27 provided on said bars 25 as best shown in FIG. 4.

Figure 5:
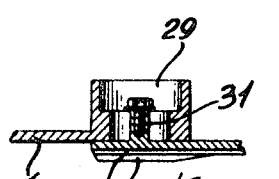
FIG. 5 is a cross-sectional view along line 5—5 of FIG. 7 hereinbelow mentioned.

Bars 25 are furthermore provided with two curved slots 29, each located at one extremity of the bar. These slots receive corresponding pin elements 31 provided on the rear edge of each adjacent board as best shown in FIG. 5. Pin elements 31 slide inside slots 29 and the purpose of these slots and pin arrangement is to prevent the vertical displacement or separation between the front edge and rear edge of two adjacent boards and also to limit the relative horizontal pivotal movement of each board with respect to the other thus eliminating any excessive, undesirable or uncontrollable pivoting or swivelling of the adjacent boards when negociating curves. FIG. 5 shows this slot and pin arrangement.

Each board is furthermore provided with lateral handle elements 33 having central slot 35 for permitting to the hands of the sled occupants to grip said handle elements. Each handle element is furthermore provided with a longitudinal hole 37 located beneath said central slot 35 for receiving a cable 39 as will be explained in the following paragraph.

Cable 39 which forms the steering cable of a steering system for the sled has it two free ends 41 connected by hook means 42 (see FIG. 3) to the transverse bar 21 of the rear board 15. Cable 39 runs along the two lateral sides of flat boards 1, passing through holes 37 of the handle elements and also through holes 43 provided at the ends of the transverse bars 25. This cable then passes around two pulleys 45 located on either side of the steering column 9 and is wound around a spool 47 firmly connected at the base of said steering column 9. The winding of the cable around said steering column is such that when the steering wheel is rotated to the right as shown by arrow C in FIG. 6 the right side portion of this cable is shortened whereas the left side portion of this cable is lengthened thus providing the pivoting of said boards around their pivots and procuring to the whole sled an arcuate concave shape as best shown in FIG. 6.

Cable 39, instead of being made of one part wound around steering column 9, as above described, may be made of two parts, each part being connected at its extremities to bar 21 and to the steering column 9. This arrangement provides, as far as the steering is concerned, the same result as above explained.

The reverse position as best shown in FIG. 7 by dotted lines, happens when the steering wheel is rotated in the other direction indicated by arrow D in FIG. 7.

Resilient members, such as return springs made of two spring blades 49, V-shaped, are resiliently inserted between the forward part of each board 1 and rearward part of an adjacent board. These members 49 provide the resilient re-alignment of the boards when the steering wheel is released by the conductor of the sled after being rotated either right or left when negotiating curves.

In fact when, for example, the steering wheel is rotated to the right (arrow C, FIG. 6), and the right side portion of cable 39 is shortened, the left side portion thereof being lengthened, the right side blade 49 is compressed and the left side blade is relatively loosened as best shown in FIG. 8. When the steering wheel is released by the conductor of the sled the right side blades exercise an action on handle elements 33 as shown by arrow E in FIG. 8, and push back to their initial aligned position the flat boards.

The spring blades 49 have one of their ends connected to pivots 3 of two adjacent boards, and their other ends connected to and resting on the lateral handle elements 33.

Under each flat board there are provided elongated runner elements 51, having relatively short heights, which extend to the half length of each board as best shown in FIG. 9. These runner elements are made as a corrugated plate.

Two lateral runners 53 are also provided on the extreme longitudinal edges of each board. These lateral runners are shorter than the runner elements and have a height which is greater than the height of the runner elements 51 forming the corrugated plate.

Runner elements 51 and runners 53 serve to prevent the skidding of the sled into right or left.

The sled is also provided with folding means, such as horizontal pivots 55 and a joint part 57 arranged between two adjacent boards 1, which permits the folding of the sled for storage or transportation purposes (FIG. 3).

The upper ends of pin elements 31 are countersunk in slots 29.

Although I have described my invention with a certain degree of particularity, it is understood that the present disclosure has been made only by way of example and that numerous changes in the details of construction and the combination and arrangement of parts may be made to this invention without departing from the spirit and the scope of the invention as described and claimed.

For instance, the steering mechanism and the braking system may be placed in any other part of the sled instead of being placed at the front and at the rear thereof, respectively, and may be made of equivalent parts to those presently described. The resilient members for the re-alignment of the pivoted boards, may be substituted by equivalent means.

I claim:

1. An articulated and steerable snow sled comprising:
   a. flat boards connected to each other forming said sled;
   b. a steering mechanism provided on the front board of said flat boards for steering said sled;
   c. a braking system connected to the rear board of said flat boards for providing the braking of said sled;
   d. handle elements provided on the lateral sides of each flat board for providing gripping means for the occupants of the sled;
   e. a cable system connected to said steering mechanism and to the rear edge of said rear board, said cable system running along the lateral sides of said boards and passing through said handle elements, said cable system providing under the movement of said steering mechanism the horizontal pivoting of said boards with respect to each other;
   f. resilient members connected to the forward part of each board and to said handle elements respectively in order to provide the re-alignment of the pivoted boards when said steering mechanism is released by the conductor of the sled.

2. A snow sled according to claim 1, said sled being composed of a plurality of flat boards.

3. A snow sled according to claim 2, wherein said handle elements are positioned at the rearward part of each flat board.

4. A snow sled according to claim 2, wherein the forward part of each flat board is provided with a transverse bar, each transverse bar having at least two curved slots, each slot being located at one extremity of said transverse bar, and wherein the rear edge of each board is provided with two pins corresponding to said slots, said pins being inserted inside said slots in such a way as to prevent the vertical separation of two adjacent boards and as to limit the horizontal pivoting of said boards with respect to each other, thus preventing any uncontrollable pivoting of these boards.

5. A snow sled according to claim 2, wherein each board is provided on its bottom surface resting on the snow with runner elements, said runner elements being formed as a corrugated plate, and wherein each board is further provided with two lateral runners each located under the extreme lateral edge of a board, said runner elements and said lateral runners preventing any undesirable sliding of the sled into right or left.

6. A snow sled according to claim 2, wherein said braking system comprises two blade elements connected by means of pivots to the rear edge of the rear board, and wherein there is the provision of lever means connected to said blade elements and positioned adjacent said handle elements of said rear board for permitting the manual actuation of the blade elements by the occupant of said rear board.

7. A snow sled according to claim 2, wherein said resilient members are made of two spring blades, V-shaped, one end of each spring blade being connected to said handle element and the other end of the same spring blade being connected to a pivot connecting two consecutive adjacent boards.

8. A snow sled according to claim 2, wherein pulleys are provided on the front board of said flat boards and around which said cable passes before being wound around said steering mechanism.

9. A snow sled according to claim 2, wherein the front board is provided with an outwardly curved forward edge, which curved edge is connected to said steering mechanism through a sleeve.

10. A snow sled according to claim 2, wherein two of the flat boards connected to each other are provided with folding means, said means providing the folding of the sled.

11. A snow sled according to claim 2, wherein said handle elements are provided with slots to permit to the hands of the sled occupants to firmly grip said handle elements.

12. A snow sled according to claim 4, wherein said handle elements and said transverse bars are provided with longitudinal holes to permit to said cable to pass through said holes and be guided thereby.

13. A snow sled according to claim 7, wherein said pivot connecting two adjacent boards is countersunk into a hole provided on said transverse bar.

14. A snow sled according to claim 4, wherein said pins are countersunk into said curved slots.

15. A snow sled according to claim 5, wherein said runner elements and said two lateral runners are located at the rear part of each board.

* * * * *